A. MILLER.
GARDEN TOOL.
APPLICATION FILED JUNE 13, 1919.
1,385,089.
Patented July 19, 1921.
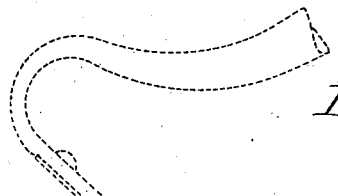
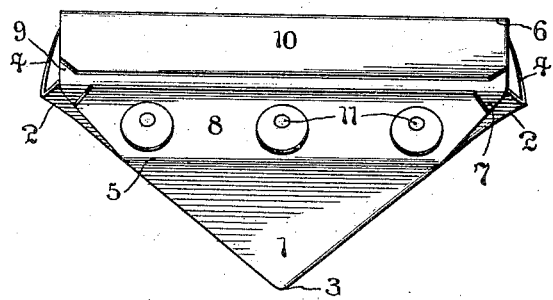
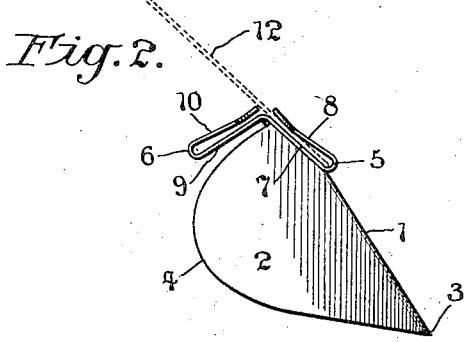
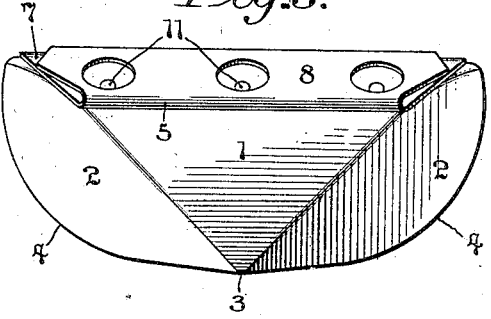
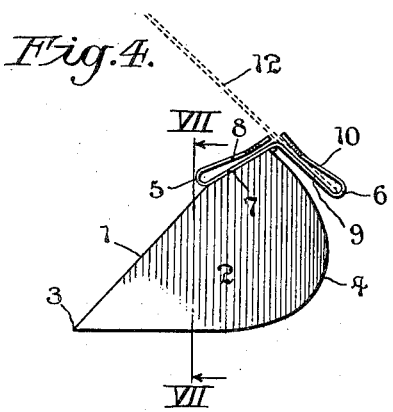
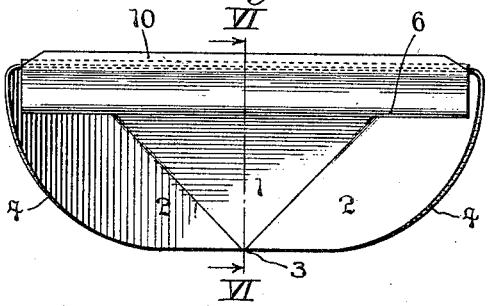
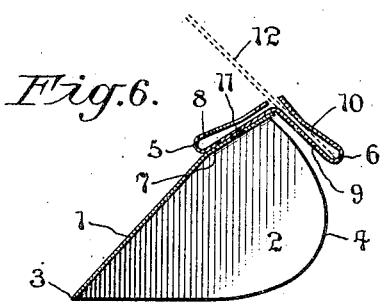
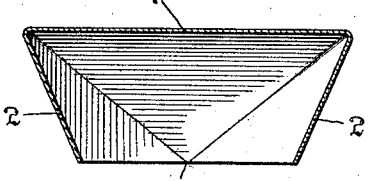
Inventor:
Arthur Miller
by his attorneys

UNITED STATES PATENT OFFICE.

ARTHUR MILLER, OF BROOKLYN, NEW YORK.

GARDEN-TOOL.

1,385,089. Specification of Letters Patent. Patented July 19, 1921.

Application filed June 13, 1919. Serial No. 303,963.

*To all whom it may concern:*

Be it known that I, ARTHUR MILLER, a citizen of the United States, and resident of the borough of Brooklyn, in the city and State of New York, have invented a new and useful Improvement in Garden-Tools, of which the following is a specification.

This invention relates to improvements in garden tools and has for its object to provide a device adapted to be removably secured to a blade of a hoe or similar tool for making a furrow or drill.

Another object is to provide a tool which is arranged to be reversed and secured to the blade of a hoe for closing or filling a furrow.

A still further object is to provide certain improvements in the form, construction and arrangement of the parts, whereby the above named and other objects may be effectively attained.

A practical embodiment of my invention is represented in the accompanying drawings, in which—

Figure 1 represents a plan view of my device.

Fig. 2 represents a side elevation of the same showing the position it assumes when applied to the blade of a hoe for making a furrow, the hoe being shown in dotted outline.

Fig. 3 represents a front elevation of the same.

Fig. 4 represents a side elevation of the device applied to the blade of a hoe for closing or filling a furrow, the blade of the hoe being shown in dotted outline.

Fig. 5 represents a front elevation of the same.

Fig. 6 represents a vertical central section taken in the plane of the line VI—VI of Fig. 5, and Fig. 7 represents a vertical section taken in the plane of the line VII—VII of Fig. 4, looking in the direction of the arrows.

The device comprises a blade denoted by 1, of triangular shape, and downwardly extending wings 2 depending from the blade. The wings 2 are substantially of triangular form, one edge of each wing being formed by being bent on the triangular blade 1, so that one point of each wing and the triangular blade will converge as shown at 3 in the several figures. The free corner of each wing is rounded and denoted by 4.

The rear end of the blade is provided with yielding clips 5—6 formed of a single piece of metal, and arranged approximately at right angles to each other. The clip 5 is formed of a rigid member 7, and a yielding member 8, and the clip 6 with a rigid member 9 and a yielding member 10. The clips are secured to the blade 1 by any well known and approved means, in the present instance I have shown rivets 11 which engage the rigid member 7 and the blade 1, as shown in Fig. 6. When the clips are secured in position on the blade 1, the clip 6 will overhang the blade 1 and extend a slight distance downwardly between the wide ends of the wings 2. The position of the clips is such that the tool may be secured to a blade 12 of the hoe, shown in dotted outline in Figs. 2, 3 and 4, and assume approximately the same angle as the blade, so that it may be operated similar to that of the hoe and perform its particular function.

In operating the tool to form a furrow or a drill, the tool is secured in position on the hoe by forcing the clip 5 onto the blade 12 as shown in Fig. 2 and by placing the point 3 of the tool into the ground and drawing it toward the operator, a furrow will be formed. To close or fill a furrow, the clip 6 is forced on the blade 12 of the hoe, as shown in Fig. 4, in which position the wings 2 of the tool, when drawn toward the operator will turn the earth toward the center of the furrow and rearwardly toward the point 3 where it will be delivered into the furrow.

It will be understood that various changes may be resorted to in the form, construction and arrangement of the several parts without departing from the spirit and scope of my invention; and hence I do not intend to be limited to the specific details herein set forth except as they may be included in the claims.

What I claim is:

1. A garden tool comprising, a triangular blade having wings depending therefrom.

2. A garden tool comprising, a blade having substantially triangular wings depending therefrom.

3. A garden tool comprising, a triangular blade having substantially triangular wings depending therefrom.

4. A garden tool comprising, a triangular blade having substantially triangular wings depending therefrom, each of said wings having a curved outer edge.

5. A garden tool comprising, a triangular blade having substantially triangular wings depending therefrom, the apices of said blade and wings being substantially coincident.

6. A garden tool comprising, a triangular blade having substantially triangular wings depending therefrom, each of said wings having a curved outer edge, and the apices of said blade and wings being substantially coincident.

7. A garden tool comprising, a triangular blade having substantially triangular wings depending therefrom, the walls of said blade and wings converging to a substantially common point.

8. A garden tool comprising, a triangular blade having substantially triangular wings depending therefrom, each of said wings having a curved outer edge and the walls of said blade and wings converging to a substantially common point.

In testimony, that I claim the foregoing as my invention, I have signed my name this 29th day of May, 1919.

ARTHUR MILLER.